United States Patent [19]

Gress

[11] Patent Number: 4,787,531

[45] Date of Patent: Nov. 29, 1988

[54] COVER AND SEAL FOR POWER DRIVEN THREADING MACHINE OIL RESERVOIR

[75] Inventor: Paul W. Gress, Bay Village, Ohio

[73] Assignee: Emerson Electric Co., St. Louis, Mo.

[21] Appl. No.: 158,939

[22] Filed: Feb. 22, 1988

[51] Int. Cl.⁴ ............................................. B65D 45/16
[52] U.S. Cl. ...................................... 220/324; 220/378
[58] Field of Search ................................. 220/324, 378

[56] References Cited

U.S. PATENT DOCUMENTS 1,947,874  2/1934  Pealer ........................................ 10/87
2,353,796  7/1944  Tinnerman ............................ 220/324

Primary Examiner—George T. Hall
Attorney, Agent, or Firm—Body, Vickers & Daniels

[57] ABSTRACT

A removable cover and seal is disclosed for the oil reservoir of a power driven threading machine to facilitate transportation and storage of the machine without having to drain the oil reservoir. The cover is comprised of sheet metal having a flange about the outer peripheral edge thereof which conforms to the contour of the inner surface of the oil reservoir and is provided with a neoprene sealing gasket adapted to be compressed between the flange and inner surface of the oil reservoir when in covering and sealing relationship therewith. The cover is removably mounted on the reservoir and biased to maintain the sealing gasket compressed against the reservoir walls by means of spring clips mounted on the cover and interengaging with portions of the machine housing.

21 Claims, 4 Drawing Sheets

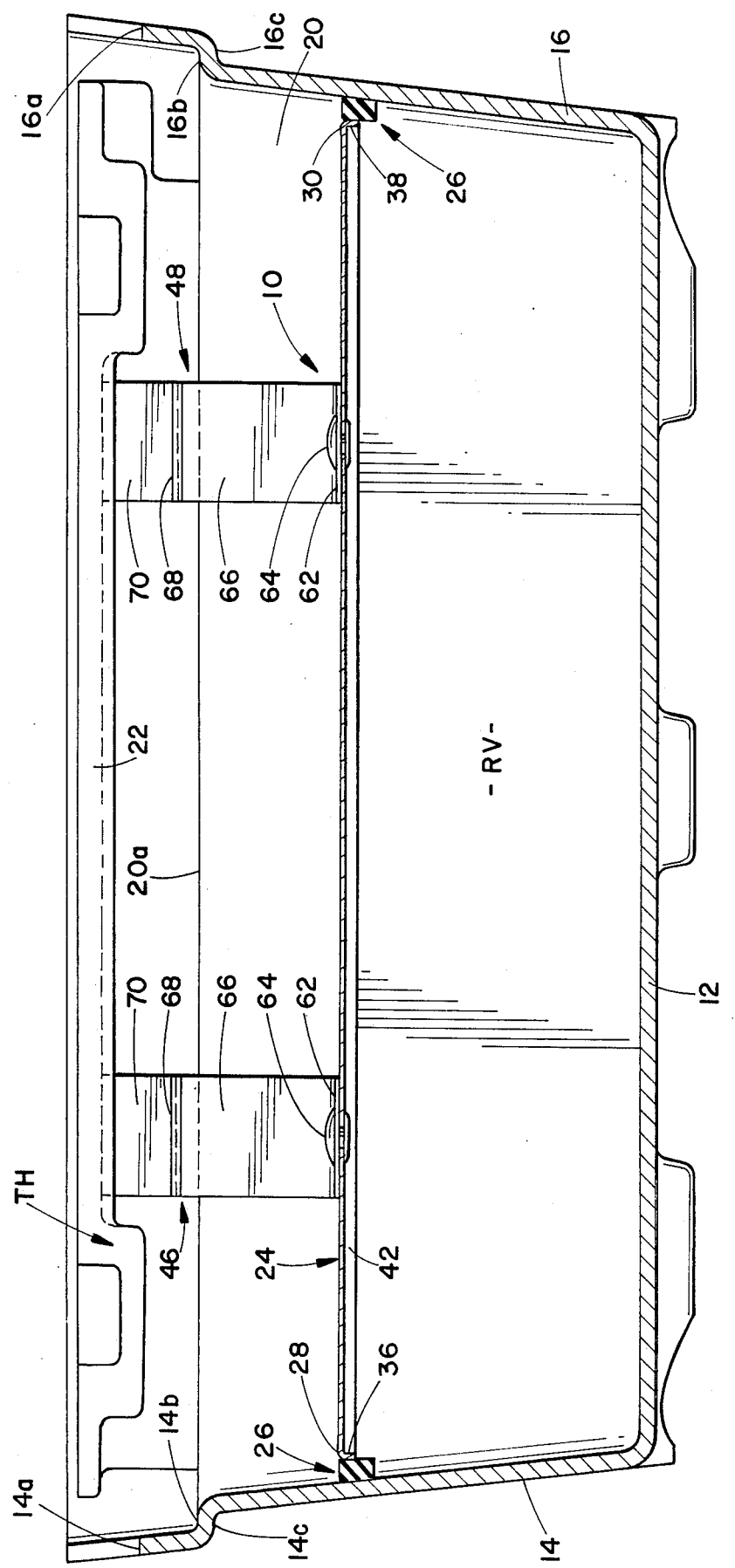

COVER AND SEAL FOR POWER DRIVEN THREADING MACHINE OIL RESERVOIR

BACKGROUND OF THE INVENTION

This invention relates to the art of power driven threading machines and, more particularly, to an attachment for covering and sealing the oil reservoir of such a machine to facilitate transportation and storage of the machine without having to drain the oil reservoir.

It is of course well known that power driven threading machines generally include tools for cutting, reaming and threading workpieces such as pipes or rods and that, in connection with such metalworking operations, a lubricating and cooling liquid such as oil is directed against the workpiece and tooling, collected in a reservoir therebeneath and circulated between the reservoir and the point of application to the workpiece and tooling by a pump. It is likewise well known to provide both wheeled and wheelless stands to support such threading machines during use and to facilitate the portability thereof from one location to another and the storage thereof during periods of non-use. Certain wheeled stands heretofore provided for the latter purposes are of a structural character which provides for folding of the stand with the threading machine thereon into a configuration in which the stand is in the form of a dolly having wheels at one end and a handle at the other. Such a stand provides for wheeled movement of the machine thereon in an inclined disposition relative to an underlying surface and, in some instances, storage of the machine on the stand in such an inclined disposition.

It will be appreciated that the displacement of wheelless stands from one location to another, such as by lifting and carrying the stand and the machine thereon, often results in the oil in the machine's reservoir splashing out of the reservoir either onto other parts of the machine and stand, the operator or operators moving the machine and stand, or the underlying surface along which the stand is being moved. Similarly, in moving a threading machine on a non-folding stand having wheels at one end, the opposite end of the stand is elevated to facilitate wheeled movement and, depending on the condition of the underlying surface, such wheeled movement can result in vibration, bouncing and the like of the stand and machine and thus the splashing of oil from the reservoir. Moreover, the lifting of one end of the stand results in movement of the oil level in the reservoir toward the upper edge of one wall thereof, thus promoting the likelihood of splashing of oil from the reservoir during movement of the stand.

In connection with a stand which is capable of being folded and used in the manner of a wheeled dolly to move and/or store the threading machine in an inclined disposition, it will be readily appreciated that the stand and machine are at such an incline that it is necessary to drain the reservoir prior to such movement or storage of the machine and stand to prevent the pouring or spilling of oil from the reservoir. Such draining of the reservoir may also be advisable in connection with the movement of non-folding stands to preclude the splashing of oil which not only results in a clean-up operation but also in a loss of oil. However, such draining of the reservoir is undesirable for a number of reasons. In this respect, the draining operation is time consuming and requires a separate storage receptacle for the oil. Then, both the machine and the storage receptacle have to be transported and stored and, prior to subsequent use of the machine, the oil has to be replaced therein. Accordingly, it becomes advantageous to avoid having to drain the oil reservoir of the threading machine while, at the same time, providing a threading machine to be transportable and storable, even in a disposition inclined to horizontal, without the loss of oil from the machine reservoir.

SUMMARY OF THE INVENTION

In accordance with the present invention, an attachment is provided for a power driven threading machine which enables the latter to be transported on a stand or otherwise and with the machine in an inclined disposition relative to horizontal without having to drain the oil reservoir and without concern for the loss of oil from the reservoir such as by splashing or spilling. More particularly in accordance with the present invention, a removable cover and seal component is provided for the oil reservoir of a threading machine. The cover and seal includes an impervious cover portion and a sealing gasket compressed against the inner surfaces of the reservoir walls. Retaining members on the cover portion interengage with housing portions of the threading machine to releaseably retain the cover and seal in place. In a preferred embodiment, the side walls of the oil reservoir are inclined downwardly and inwardly relative to the bottom wall of the reservoir and the foregoing sealed relationship is achieved by a metal cover plate bounded by a compressible sealing gasket which is progressively compressed between the reservoir walls and cover plate as the latter is moved downwardly relative to the reservoir walls. The retaining members are preferably in the form of spring clips, and when the cover plate and sealing gasket are positioned in the reservoir to sealingly close the open upper end of the latter, the spring clips exert a downward force against the cover plate to maintain a compressive force against the sealing gasket. Following transportation and/or storage of the machine, all that is necessary to ready the machine for use is to remove the cover and seal component.

It is accordingly an outstanding object of the present invention to provide a power driven threading machine attachment for covering and sealing the oil reservoir of the machine so as to facilitate the transportation and/or storage of the machine without having to drain the oil from the machine and without losing oil from the reservoir such as by splashing or spilling.

Another object is the provision of a cover and sealing attachment of the foregoing character which minimizes the time required to prepare a threading machine for transportation and/or storage as well as reducing the care required, especially during transporting of the machine, to avoid the splashing or spillage of oil from the reservoir.

Still another object is the provision of a cover and sealing attachment of the foregoing character which promotes increasing productive time with respect to use of the threading machine by eliminating the time required to drain the machine's oil reservoir prior to a transporting and/or storage operation and the time required to refill the reservoir prior to a subsequent use of the machine.

Yet a further object is the provision of a cover and sealing attachment of the foregoing character which is structurally simple and easy to install and remove and which, when installed, promotes maintaining compressively sealed engagement between the attachment and the walls of a machine reservoir thereby effectively sealing the oil in the reservoir against leakage across the attachment, even when the machine is stored in a disposition in which the oil in the reservoir is in contact with the sealing material of the attachment.

BRIEF DESCRIPTION OF THE DRAWINGS

The foregoing objects, and others, will in part be obvious and in part pointed out more fully hereinafter in conjunction with the written description of a preferred embodiment of the invention shown in the accompanying drawing in which.

DESCRIPTION OF A PREFERRED EMBODIMENT

Figure 1:
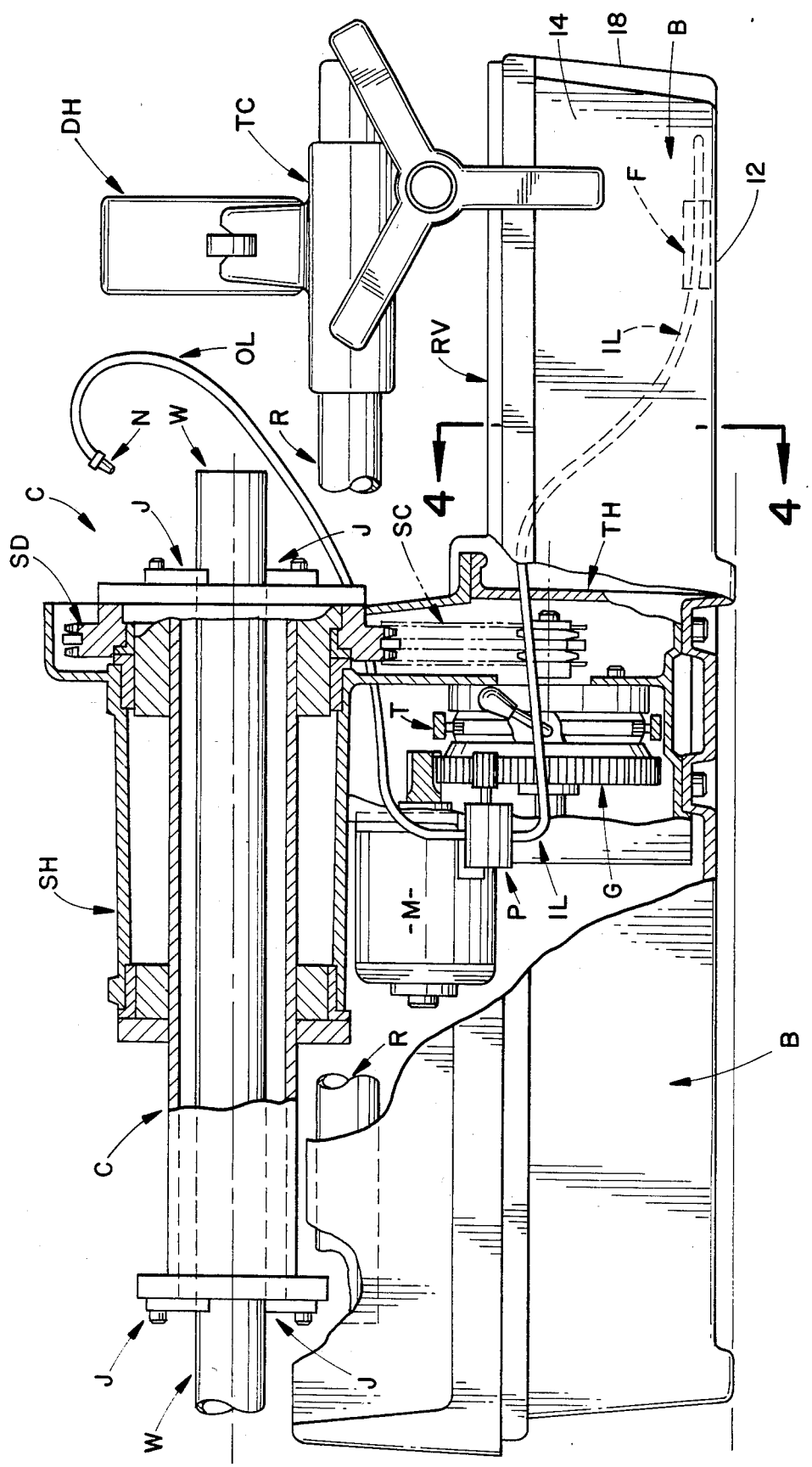
FIG. 1 is a side elevation view, partly in section, of a power driven threading machine of the character with which the attachment of the present invention is usable.

With reference now to the drawings wherein the showings are for the purpose of illustrating a preferred embodiment of the invention only and not for the purpose of limiting the invention, FIG. 1 illustrates a threading machine of the character with which the attachment of the present invention is usable and, as will be seen from the latter Figure, such a threading machine basically comprises a drive unit including a transmission T driven by an electric motor M, and a workpiece supporting and rotating chuck assembly C. The chuck assembly is rotatably supported in a spindle housing SH which is mounted on the transmission housing TH which in turn is suitably secured to the bottom wall of a generally pan-shaped housing B. Transmission T drives an output sprocket wheel SW which is coupled by means of a sprocket chain SC with a sprocket drive component SD of chuck assembly C, whereby the chuck assembly is rotated in response to rotation of sprocket SW. The chuck assembly includes a plurality of jaws J at the opposite ends thereof for engaging and supporting a workpiece W for rotation about the chuck or machine axis A. As is further well known, such a power driven threading machine includes a tool carriage TC supported on and movable along a pair of support rods R extending along laterally opposite sides of the machine, and the tool carriage carries or is adapted to support a variety of metalworking tools, such as the thread cutting die head schematically illustrated and designated DH in FIG. 1 and by which the adjacent end of workpiece W is adapted to be threaded. In connection with metalworking operations, a lubricating and cooling fluid such as oil is applied to the workpiece and tooling during cutting interengagement therebetween such as by means of an oil nozzle N, and the portion of pan-shaped housing B underlying tool carriage TC and the area where cutting takes place defines a reservoir RV into which the cooling and lubricating oil drops and collects for recirculation to nozzle N. More particularly in this respect, the oil reservoir is generally provided with a filter component F connected to the inlet side of an oil circulating pump P by means of an inlet line IL. Pump P is suitably mounted in the machine housing and, in the machine illustrated, is adapted to be driven by the transmission input gear G through a pinion gear, not designated, connected to the pump shaft. The outlet side of pump P is connected to nozzle N by an output line OL. Accordingly, it will be appreciated that when the machine is in use pump P is driven to continuously circulate lubricating and cooling oil from the reservoir RV to nozzle N. During periods of non-use, the lubricating and cooling oil is stored in reservoir RV.

Figure 2:
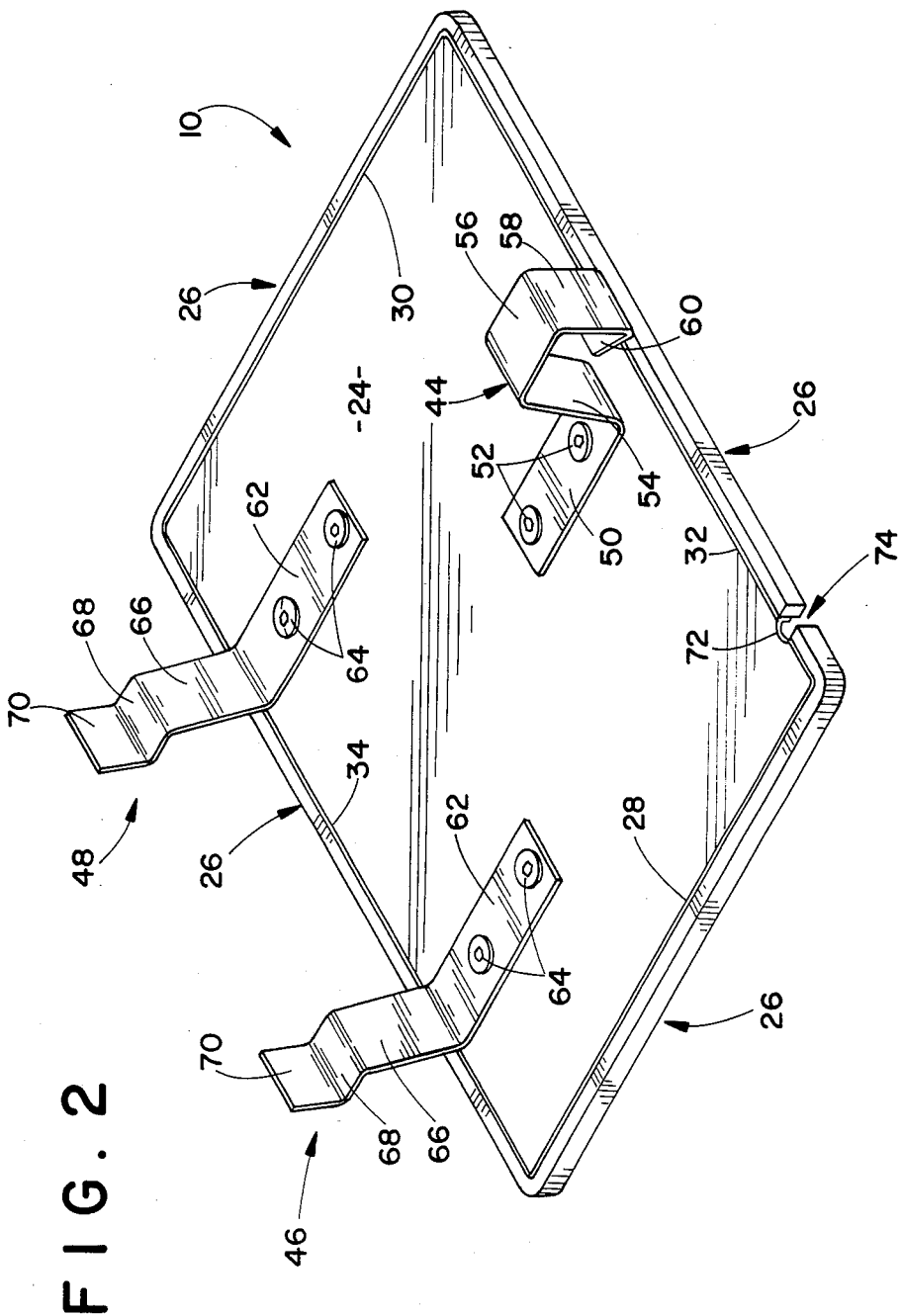
FIG. 2 is a perspective view of a preferred embodiment of the attachment.
Figure 3:
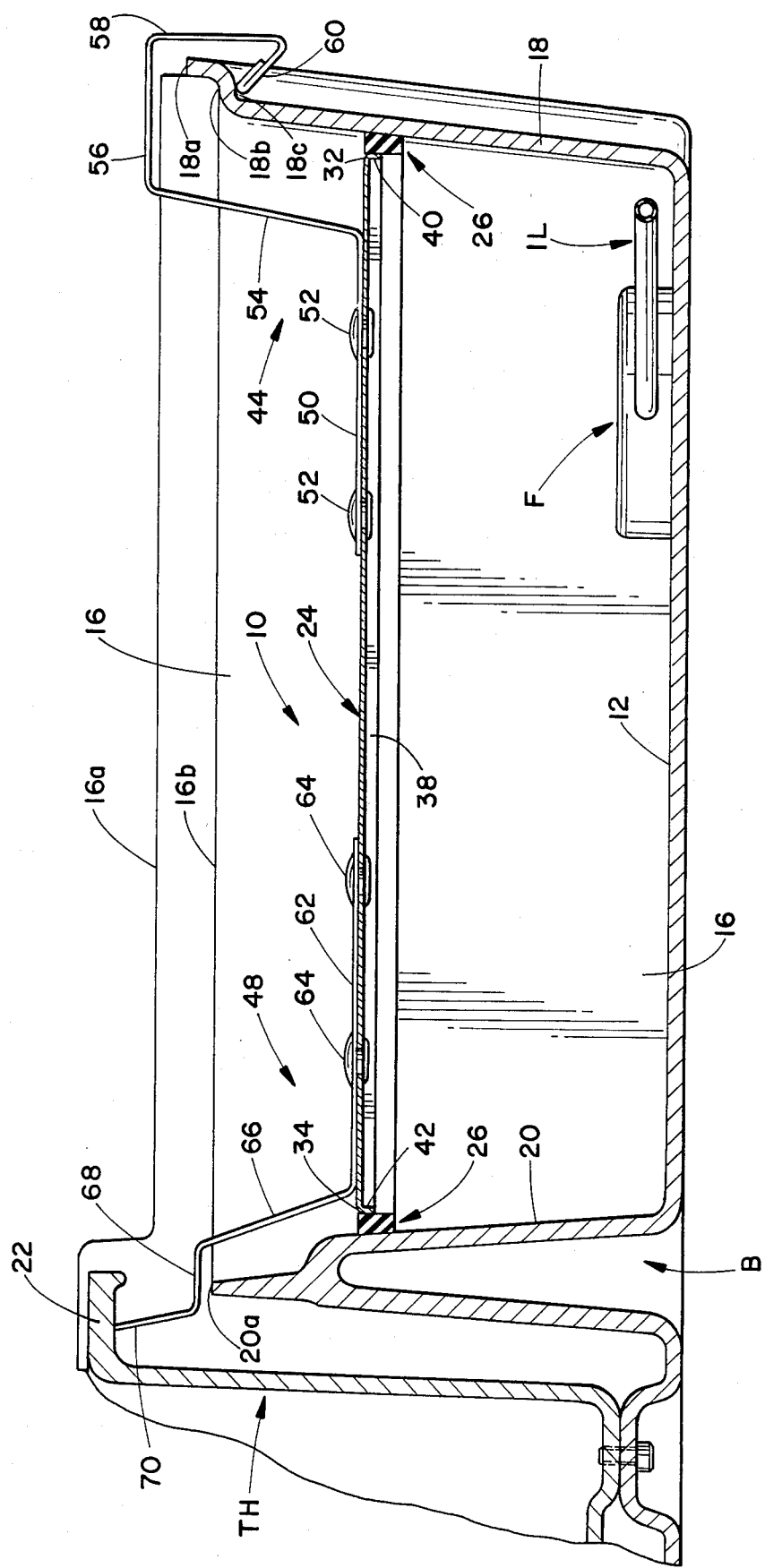
FIG. 3 is a sectional side elevation view through the oil receptacle of the threading machine shown in FIG. 1 and showing the attachment in place therein; and, FIG. 4 is a cross-sectional elevation view of the oil receptacle as seen along line 4—4 in FIG. 1 and showing the attachment in place therein.

In accordance with the present invention, and as will be seen from FIGS. 2-4 of the drawing, an attachment 10 is provided for covering and sealing the open upper end of reservoir RV during periods of non-use of the threading machine so as to preclude the splashing or spillage of oil from the reservoir regardless of the angular disposition of the machine relative to horizontal. In connection with the threading machine with which the attachment is illustrated in the drawings, reservoir RV is defined by a bottom wall portion 12 of housing B, opposed side wall portions 14 and 16 of the housing extending upwardly from and inclined outwardly relative to bottom wall 12, an outer end wall 18 of the housing extending upwardly from and inclined outwardly relative to bottom wall 12 and a partition wall 20 opposite wall 18 and extending upwardly from and inclined outwardly relative to bottom wall 12 and providing an inner end wall for the reservoir. Preferably, housing B is of one-piece molded construction whereby it will be appreciated that the bottom side and end walls of reservoir RB are integral with one another. Side walls 14 and 16 and end walls 18 and 20 have corresponding upper edges 14a, 16a, 18a and 20a, respectively. Further, the upper ends of side walls 14 and 16 and outer end wall 18 are each outwardly offset to provide a corresponding inner ledge 14b, 16b and 18b extending therealong and a corresponding outer lip 14c, 16c and 18c, respectively. Generally, during use of the threading machine, a perforated chip pan covers the open top of reservoir RV to catch metal turnings and the like so that the latter do not enter the reservoir with the oil, and ledges 14b, 16b and 18b serve to support such a pan in the machine shown. Further in connection with the machine illustrated in the drawings, transmission housing TH includes a flange or projection 22 spaced above upper end 20a of wall 20 and extending toward reservoir RV. Projection 22 serves the function set forth more fully hereinafter.

Attachment 10 is comprised of a cover plate 24 of impervious material, preferably sheet metal, having an outer edge contour conforming to that of the inner surfaces of the side walls and end walls of the reservoir along a horizontal peripheral sealing surface area of the walls below the upper ends thereof. The outer periphery of cover plate 24 is bounded by a sealing gasket 26 of compressible material which engages against the inner surfaces of the reservoir walls along the sealing surface area thereof and is compressed between the latter walls and the corresponding edges of the cover plate when the attachment is in place in the reservoir as will become more apparent hereinafter. In accordance with the inner surface contours of the walls of the reservoir illustrated in the drawing, cover plate 24 has linear sides edges 28 and 30 respectively corresponding in contour to the inner surfaces of side walls 14 and 16 of the reservoir, and linear outer and inner edges 32 and 34 respectively corresponding in contour to the inner surfaces of outer and inner walls 18 and 20 of the reservoir. Further, cover plate 24 includes flanges 36, 38, 40 and 42 coextensive with and depending downwardly from edges 28, 30, 32 and 34, respectively, and perpendicular to the plane of cover plate 24. Sealing gasket 26 in its uncompressed condition is rectangular in cross-section and preferably is secured to the outer surface of flanges 36, 38, 40 and 42 by means of a suitable adhesive.

Attachment 10 is adapted to be removably secured in place within reservoir RV with the sealing gasket compressibly engaged between the cover plate flanges and reservoir walls and, in the embodiment shown, such retention is achieved by a plurality of retaining members 44, 46 and 48 which releaseably interengage the attachment with portions of the machine housing. Retaining member 44 is adjacent edge 32 of cover plate 24 and generally centrally between the opposite ends thereof and is in the form of a spring clip, preferably of spring steel, having a first end 50 suitably secured to cover plate 24 such as by rivets 52. Retaining member 44 further includes a first leg 54 spaced inwardly from wall 18 and extending upwardly from cover plate 24 to a point spaced above upper end 18a of wall 18, a second leg 56 extending outwardly from the upper end of leg 54 across upper end 18a of wall 18, a third leg 58 spaced outwardly from wall 18 and extending downwardly from leg 56 to a point below lip 18c of wall 18, and a second end 60 which extends upwardly and inwardly from the lower end of leg 58 to engage under lip 18c.

Each of the retaining members 46 and 48 is also preferably in the form of a spring steel retaining clip having a first end 62 secured to cover plate 24 such as by rivets 64. Retaining members 46 and 48 are adjacent edge 34 of cover plate 24 and are spaced apart along the length thereof symmetrically with respect to retaining member 44. Each of the retaining members 46 and 48 further includes a first leg 66 spaced inwardly from wall 20 and extending upwardly from and outwardly relative to cover plate 24 to a point spaced above upper end 20a of wall 20, a second leg 86 spaced above end 20a and extending horizontally outward from the upper end of leg 66 across end 20a of wall 20, and a second end 70 extending upwardly from the outer end of leg 68 to engage against the underside of projection 22. Accordingly, it will be appreciated that when attachment 10 is positioned in oil reservoir RV for sealing gasket 26 to be compressed between the cover plate flanges and the sealing areas of the side walls of the reservoir, each of the retaining members 44, 46 and 48 is free to flex between the first and second ends thereof, whereby the retaining members when engaged with the corresponding one of the lip 18c and projection 22 exert a spring biasing force downwardly against cover plate 24 to retain the cover plate in its mounted position and to maintain the sealing gasket in its compressed sealing engagement with the sealing surface of the reservoir walls. As will be appreciated from FIG. 3 of the drawing, removal of the attachment from reservoir RV is achieved by outward displacement of second end 60 of retaining member 44 relative to lip 18c, upward displacement of the corresponding end of cover plate 24 to an inclined disposition relative to the inner end thereof, and withdrawal of the cover plate and thus retaining members 46 and 48 from beneath projection 22. It will likewise be appreciated that mounting of the attachment on the reservoir is achieved in the reverse manner.

In the embodiment shown in the drawings, and as will be seen from FIG. 2, a recess 72 is provided in cover plate 24 adjacent one end of edge 32 thereof, and sealing gasket 26 terminates at each of the opposite ends of recess 72 to provide an opening 74 to accommodate oil line IL leading from filter F to oil pump P. More particularly in this respect, the oil line is comprised of flexible tubing and, in connection with the threading machine illustrated in FIG. 1 of the drawing, extends from the filter toward reservoir wall 14 and thence rearwardly in the reservoir and across the upper end of inner wall 20 to the oil pump. Opening 74 provides for positioning the portion of the oil line adjacent the filter to extend upwardly through opening 74 and thence over the attachment 10 to pump P. It will be appreciated, of course, that if an opening such as opening 74 is provided for the oil line, it can be positioned anywhere about the periphery of attachment 10 in order to accommodate the particular configuration of the path of the oil line from the filter to the pump. It will be further appreciated that the configuration of recess 72 and the spacing of the ends of sealing gasket 26 are such as to provide for opening 74 to engage and seal about the oil line so that there is no leakage to oil thereacross. Moreover, it will be understood that such an opening for the oil line may not be necessary. In this respect, for example, the threading machine design could be such as to provide for the oil line to extend to the oil pump through a sealed opening for the line in inner end wall 20 of the reservoir below attachment 10.

In connection with closing and sealing an oil reservoir defined by inclined walls as shown for reservoir RV herein, it will be appreciated that sealign engagement between the sealing gasket and reservoir walls can be at any vertical location along the walls above the oil level in the reservoir, and that the selected level of such sealing will determine the dimensions of the cover plate of the attachment. Preferably in connection with a reservoir having inclined walls, the overall length and width of the attachment as defined by the outermost surfaces of the sealing gasket is at least slightly greater than the corresponding dimensions along the sealing area of the side and end walls of the reservoir when the attachment is in its mounted position relative to the reservoir. This relationship assures that the sealing gasket is compressed between the cover plate flanges and reservoir walls at the outermost upper edges of the sealing gasket. Such compression of the sealing gasket at the uppermost edges thereof together with the inclined disposition of the walls provides for compression of the sealing gasket to be progressively increased downwardly from the uppermost edges thereof. In the embodiment of the attachment disclosed herein, cover plate 24 is approximately 10.2 inches along side edges 28 and 30 and approximately 13.8 inches along end edges 32 and 34 and is produced from 18 gauge cold rolled steel. The flanges about the periphery of the cover plate extend downwardly therefrom about 0.17 inch from the upper surface of the cover plate, and sealing gasket 26 is of neoprene material having a durometer hardness of from about 35 to 40. Further, the sealing gasket has a thickness horizontally of the cover plate of about 0.25 inch and a vertical height of about 0.38 inch.

While sealing gasket 26 is laterally interposed between the cover plate flanges and inclined reservoir walls to achieve compression of the sealing gasket in the embodiment disclosed, it will be appreciated such compression of the gasket to close and seal the reservoir can be achieved with other dispositions of the sealing gasket relative to the cover plate and reservoir walls, depending on the contour of the latter. For example, the upper end of inner wall 20 of the reservoir shown could be configured to provide a ledge corresponding to ledges 14b and 16b of the side walls and ledge 18b of outer end wall 18, or such a ledge configuration could be provided on the reservoir walls beneath the ledges shown, with such a wall contour, sealing gasket 26 could be secured to the underside of the cover plate about the periphery thereof so as to be compressed downwardly against the ledges by the retaining clips. As another example, the laterally outer side of the sealing gasket could be inclined downwardly and inwardly relative to the cover plate flanges so as to be adequately compressed or deflected by engagement with vertical reservoir walls, thus enabling the covering and sealing of a reservoir having such a side and end wall configuration.

With further regard to the preferred embodiment, it will be appreciated that retaining members 46 and 48 could be replaced by retaining members adjacent to and extending outwardly across cover plate edges 28 and 30 and which retaining members would be structurally similar to retaining member 44, whereby the outer or second ends thereof would engage under lips 14c and 16c of side walls 14 and 16 of the reservoir. Likewise, while a single centrally located retaining member 44 provides adequate retention of the cover plate and maintenance of a downward biasing force thereagainst in the preferred embodiment, more than one such retaining member could be provided along edge 32 of the cover plate. The disclosed arrangement is preferred over such modifications in that only a single clip of the structure of retaining member 44 has to be manipulated to release the attachment for removal from the reservoir. Moreover, the central location of retaining member 44 advantageously provides for the latter to function as a handle by which the cover can be removed and easily manipulated such as in connection with cleaning any oil from the underside thereof.

Other embodiments of the invention will be obvious to those skilled in the art as will other modifications of the preferred embodiment disclosed herein, whereby it is to be distinctly understood that the foregoing descriptive matter is to be interpreted merely as illustrative of the present invention and not as a limitation.

Having thus described the invention, it is claimed:

1. An attachment for a portable power driven threading machine which includes housing means including means providing an upwardly open oil reservoir having a bottom wall and opposed pairs of walls extending upwardly from said bottom wall and having corresponding upper ends, said walls having inner surfaces providing said reservoir with a peripheral sealing surface area below said upper ends, said attachment beign removably mountable on said housing means to close and seal said reservoir and comprising, cover plate means having outer edge means, compressible sealing gasket means on said outer edge means, and cover plate retaining means for releaseably interengaging said cover plate means with said housing means to position said cover plate means and gasket means relative to said sealing surface area such that said gasket means is sealingly compressed between said sealing surface area and said edge means.

2. An attachment according to claim 1, wherein said cover plate means includes a planar portion bounded by flange means perpendicular to said planar portion and providing said outer edge means.

3. An attachment according to claim 2, wherein said sealing gasket means is secured to said flange means.

4. An attachment according to claim 3, wherein said flange means include outer surfaces and said sealing gasket means is adhesively bonded to said outer surfaces.

5. An attachment according to claim 1, wherein said cover plate retaining means includes a plurality of spring clip means having first end means secured to said cover plate means and second end means interengaging with said housing means to bias said cover plate means downwardly.

6. An attachment according to claim 5, wherein said cover plate means has opposed pairs of edges corresponding to said opposed pairs of walls of said reservoir, and said spring clip means includes spring clip members secured to said cover plate means adjacent each of the opposed edges of one of said opposed pairs of edges.

7. An attachment according to claim 5, wherein the second end of at least one of said spring clip means interengages with one wall of said reservoir.

8. An attachment according to claim 7, wherein said one wall has an outer surface including outwardly extending lip means below the upper end thereof, said second end of said one spring clip means engaging under said lip means.

9. An attachment according to claim 5, wherein said housing means includes means providing a generally horizontal projection spaced above the upper end of one wall of said reservoir, the second end of at least one of said spring clip means engaging under said projection.

10. An attachment according to claim 9, wherein the second end of at least one other of said spring clip means interengages with a second one of said walls of said reservoir.

11. An attachment according to claim 10, wherein said one and second one of said walls define one pair of said opposed pairs of walls.

12. An attachment according to claim 11, wherein said spring clip means includes a pair of spring clip members having second ends engaging under said projection and a third spring clip member having its second end interengaged with said second one of said walls.

13. An attachment according to claim 12, wherein said second one of said walls has an outer surface including outwardly extending lip means below the upper end thereof, said second end of said third spring clip member engaging under said lip means.

14. An attachment according to claim 1, wherein said cover plate means includes a planar portion bounded by flange means perpendicular to said planar portion and providing said outer edge means, and said cover plate retaining means includes a plurality of spring clip means having first ends secured to said planar portion and second ends interengaging with said housing means to bias said cover plate means downwardly.

15. An attachment according to claim 14, wherein said flange means includes outer surfaces and said sealing gasket means is adhesively bonded to said outer surfaces.

16. An attachment according to claim 15, wherein said flange means provides said cover plate means with opposed pairs of edges corresponding to said opposed pairs of walls of said reservoir, said spring clip means including at least first and second spring clip members respectively secured to said planar portion adjacent first and second edges of one of said opposed pairs of edges.

17. An attachment according to claim 16, wherein said housing means includes means providing a generally horizontal projection spaced above the upper end of the wall of said reservoir corresponding to said first edge, the second end of said first spring clip member engaging under said projection, and wherein the wall of said reservoir corresponding to said second edge has an outer surface including outwardly extending lip means below the upper end thereof, and said second end of said second spring clip member engages under said lip means.

18. An attachment according to claim 17, and a third spring clip member having a first end secured to said planar portion adjacent said first edge and having a second end engaging under said projection.

19. An attachment according to claim 18, wherein said first and third spring clip members each include a first leg extending upwardly of said planar portion from the corresponding first end and a second leg extending outwardly from said first leg across the upper end of said wall corresponding to said first edge, said second end of said first and third spring clip members extending upwardly from the corresponding second leg and engaging under said projection.

20. An attachment according to claim 19, wherein said second spring clip member includes a first leg extending upwardly of said planar portion from the corresponding first end, a second leg extending outwardly from said first leg across the upper end of the wall corresponding to said second edge, and a third leg extending from said second leg downwardly along said outer surface of the latter side wall and having an end below said lip means, said second end of said second spring clip member extending upwardly and inwardly from said end of said third leg and engaging under said lip means.

21. An attachment according to claim 20, wherein said first and third spring clip members are spaced apart along said first edge and said second spring clip member is positioned generally centrally of said second edge.

* * * * *